United States Patent [19]

Kooi et al.

[11] 3,864,818

[45] Feb. 11, 1975

[54] METHOD OF MAKING A TARGET FOR A CAMERA TUBE WITH A MOSAIC OF REGIONS FORMING RECTIFYING JUNCTIONS

[75] Inventors: Else Kooi; Arthur Marie Eugene Hoeberechts, both of Emmasingel, Eindhover, Netherlands

[73] Assignee: U.S. Philips Corporation, New York, N.Y.

[22] Filed: Feb. 20, 1973

[21] Appl. No.: 334,035

Related U.S. Application Data

[62] Division of Ser. No. 31,516, April 24, 1970, Pat. No. 3,737,702.

[30] Foreign Application Priority Data

May 6, 1969 Netherlands ....................... 6906939

[52] U.S. Cl. ...................... 29/578, 29/580, 148/188, 357/56

[51] Int. Cl. ............................................ B01j 17/00

[58] Field of Search ........ 313/66; 29/572, 578, 580; 317/235 N, 235; 117/210, 211, 213, 229; 148/187, 188; 156/12; 357/56

[56] References Cited

UNITED STATES PATENTS

| | | | |
|---|---|---|---|
| 3,385,729 | 5/1968 | Larchian | 29/576 X |
| 3,423,623 | 1/1969 | Wendland | 313/66 UX |
| 3,432,919 | 3/1969 | Rosvold | 29/580 X |
| 3,466,510 | 9/1969 | Mante | 29/580 X |
| 3,487,272 | 12/1969 | Siebertz et al. | 317/235 |
| 3,491,434 | 1/1970 | Cunningham et al. | 29/578 X |
| 3,523,223 | 8/1970 | Luxem et al. | 29/580 X |
| 3,532,539 | 10/1970 | Tokuyama et al. | 29/580 X |
| 3,534,234 | 10/1970 | Clevenger | 29/580 X |
| 3,535,774 | 10/1970 | Baker | 29/580 X |
| 3,537,921 | 11/1970 | Boland | 117/229 X |

FOREIGN PATENTS OR APPLICATIONS

| | | | |
|---|---|---|---|
| 52,962 | 12/1966 | Germany | 317/235 |

*Primary Examiner*—Roy Lake
*Assistant Examiner*—James W. Davie
*Attorney, Agent, or Firm*—Frank R. Trifari; Carl P. Steinhauser

[57] ABSTRACT

A television camera tube and method of manufacturing the same having a target comprising a substrate provided with a mosaic of regions separated from one another by grooves, each of the regions forming a rectifying junction with the substrate.

10 Claims, 15 Drawing Figures

Figure 1:
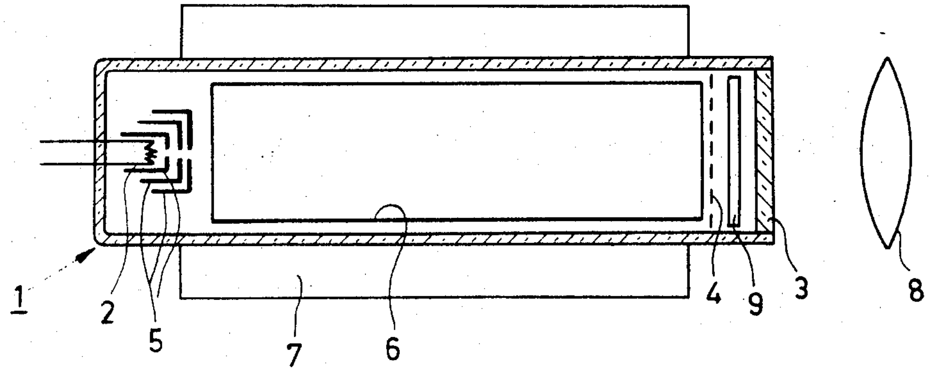

METHOD OF MAKING A TARGET FOR A CAMERA TUBE WITH A MOSAIC OF REGIONS FORMING RECTIFYING JUNCTIONS

This is a division, of application Ser. No. 31,516, filed Apr. 24, 1970, now U.S. Pat. No. 737,702.

The invention relates to a camera tube having an electron source and a radiation-sensitive target plate to be scanned by an electron beam originating from said source, the target plate being formed by a semiconductor plate which, on the side to be scanned by the electron beam, comprises a mosaic of regions which are separated from each other by grooves, in which an insulating material is situated, and which regions each constitute a rectifying junction with the part of one conductivity type of the semiconductor plate, termed the substrate, adjoining said regions.

Such a camera tube is known from U.S. Pat. No. 3,456,312. In the tube described in the patent the grooves of the semiconductor plate are entirely filled with an insulating material so that the plate has a substantially flat surface. This camera tube is a considerable improvement, to be explained in detail hereinafter, as compared with another known camera tube which has a target plate of the planar type. In a target plate of the planar type, no grooves are present and the insulating material forms a layer on the surface of a semiconductor plate, in which layers apertures are provided at the area of regions which form rectifying junctions with a substrate of one conductivity type, the insulating layer on the surface covering the substrate and the rectifying junctions. Without the insulating material, the rectifying junctions, both in the camera tube of the type mentioned in the preamble and in the camera tube having a target plate of the planar type, would be shortcircuited or the electron beam would be deflected to the substrate by the regions which are charged by the electron beam so that defocusing of the electron beam occurs and ultimately a strongly reduced contrast in the television picture results.

The insulating layer in the camera tube having a target plate of the planar type is charged by the electron beam and causes a manner of deflection of the electron beam differing from the one mentioned above, namely, a deflection in which the electron beam impinges only partly upon the plate or does not at all impinge upon the plate. In the latter case the tube is inoperative.

The deflection in which the electron beam impinges upon the plate at most partly is so strong in the camera tube having a target plate of the planar type in particular because the insulating layer charged by the electron beam, viewed in the direction of the electron beam, is situated nearer than the surfaces of the regions to be scanned by the electron beams, so that the charges in the layer exert a large influence on the deflection of the electron beam.

A number of measures are known to check the deflection by charges on or in an insulating layer. It is known, for example, to provide a conductive charge-removing metal layer on the regions and on the insulating layer. These measures are often of a complicated nature, cause new problems and have to be realized via extra steps in the manufacture.

The camera tube mentioned in U.S. Pat. No. 3,456,312 is an important improvement as compared with the camera tube having a target plate of the planar type because in the first-mentioned tube the regions and the grooves filled with an insulating material form substantially a flat surface so that, viewed in the direction of the electron beam, the charges in the insulating material in the grooves are equally far remote than the surface of the regions to be scanned so that the charges exert a smaller influence on the electron beam and less deflection occurs.

One of the objects of the invention is to improve the operation of the camera tube mentioned in the introduction. It is based on the discover that a further improvement can be obtained when the insulating material does not entirely fill the grooves.

Therefore, the camera tube mentioned in the introduction is characterized according to the invention in that at least the surface of the substrate in the grooves and the edges of the rectifying junctions are provided with a first thin insulating layer. Such a thin insulating layer has the advantage that the charges which may be provided on or in the layer by the electron beam, viewed in the direction of the electron beam, are further remote than the surfaces of the regions to be scanned by the electron beam so that it is avoided, at least considerably, that the electron beam is deflected by said charges in such manner that the electron beam does not or only partly impinges upon the regions.

A thin layer is to be understood to mean herein a layer which does not entirely fill the grooves. The rectifying junctions are in general substantially flat and the edges are lines of intersection of the junctions with the walls of the grooves.

The insulating layer preferably contains silicon oxide and the substrate consists of silicon. A silicon oxide layer on the silicon plate has the advantage that it can be provided as a dense and homogeneous layer.

In a preferred embodiment of the camera tube according to the invention a metal layer which projects over the grooves adjoining the region is provided on each region. Such a camera tube has the advantage that the possibility that the insulating layer in the grooves is charged by the electron beam is considerably restricted by the screening effect of the projecting parts of the metal layer. Moreover, the areas of incidence of the regions become larger and more charge can be provided in the regions.

In another preferred embodiment of the camera tube according to the invention a first surface zone of the substrate which has the same conductivity type as the substrate and which adjoins the walls of the grooves is more strongly doped than the part of the substrate adjoining said surface zone, said first surface zone extending at most up to the rectifying junctions. With such a camera tube it is prevented that, under the influence of charges on or in the insulating layer in the grooves, depletion zones expand from the rectifying junctions along the surface of the part of the substrate which adjoins the grooves, so that an extra leakage current is generated at said surface and even an electric connection can occur between the regions.

The first surface zone has an additional advantage which is obtained if the surface zone is, at least partly, not parallel to the other side of the substrate situated opposite to the side to be scanned. If the concentration of the impurity of one conductivity type in the surface zone increases in the direction of the walls of the grooves, a drift field for minority charge carriers will result therefrom in the opposite direction. This field contributes to the removasl of the minority charge carriers, produced during operations of the camera tube in the substrate by incident rays, to the nearest regions.

This function of the surface zone is even intensified in another preferred embodiment of the camera tube according to the invention, in which a second surface zone of the substrate which has the same conductivity type as the substrate and which adjoins the other side situated opposite to the side to be scanned is more strongly doped than the part of the substrate adjoining the second surface zone. Besides for reducing surface recombination effects, the second surface zone is actually used for obtaining a drift field which is approximately at right angles to the other side and is directed to the side to be scanned by the electron beam.

In particular when the concentration variation of the impurity determining the conductivity type in and the thickness of the first surface zone, at least in parts which do not adjoin the rectifying junctions, are substantially equal to the concentration variation of said impurity in and the thickness of, respectively, the second surface zone, the camera tube can be manufactured in a simple manner.

In still another preferred embodiment of the camera tube according to the invention, the regions consist of two sub-regions which together with the substrate form a transistor structure. The insulating layer in the grooves, particularly a dense and homogeneous one, is actually found to be particularly suitable to reduce undesirable surface phenomena at the edge of junctions between the two sub-regions of opposite conductivity types, so that a camera tube of the said structure considerably amplifies a signal produced by radiation.

The concentration variation of the impurity determining the conductivity type in and the thickness of the second surface zone are preferably substantially equal to the concentration variation of the said impurity in and the thickness of, respectively, a sub-region of the same conductivity type as the substrate. Such a camera tube comprises a target plate having a transistor structure with a substantially sufficient protection against surface recombination effects, which target plate can moreover be manufactured in a simple manner.

A configuration in which the substrate is provided with a second insulating layer on the other side is also particularly suitable to reduce surface recombination effects on said side.

In particular, a camera tube in which the first layer and the second layer contain oxide of the semiconductor material of the substrate and are substantially equally thick can be manufactured in a simple manner.

The invention furthermore relates to a radiation sensitive target plate suitable for use in a camera tube formed by a semiconductor plate which is provided on one side with a mosaic of regions which are separated from each other by grooves in which an insulating material is situated and which each constitute a rectifying junction with the part of one conductivity type of the semiconductor plate, termed the substrate, adjoining said regions, which target plate is characterized in that at least the surface of the substrate in the grooves and the edges of the rectifying junctions are provided with a first thin insulating layer.

The invention also relates to a method of manufacturing such a target plate which is characterized in that a semiconductor plate of one conductivity type is covered on one side with an apertured masking layer, the grooves, which separate the regions to be obtained, being obtained by subjecting the surface of the plate at the area of the apertures to a material-removing treatment, the surface of the semiconductor plate in the grooves being provided with a first insulating oxide layer by oxidation. According to this method, for example, a silicon semiconductor plate is provided with a silicon oxide layer which is homogeneous and dense by oxidation of said plate.

The grooves are preferably obtained by etching and an etchant- and oxidation-resistant masking layer containing silicon nitride is used. Such a layer serves as a mask both in the etching treatment for providing the grooves and in a subsequent oxidation at elevated temperature. After etching and oxidation said layer can be removed in a conventional manner. If silicon nitride and silicon oxide are used beside each other on a surface, they can be removed selectively, so that an aligning step with a mask can be avoided and the manufacture is considerably simpler.

In another preferred embodiment of the method according to the invention the grooves are obtained by etching and an etchant- and oxidation-resistant metal layer is used as a masking layer. When a metal layer is used, the masking layer is divided into metal layers on the regions prior to etching the grooves and, during etching the grooves, underethcing of the semiconductor material below the metal layers also occurs so that, when said layers are not removed ultimately, the metal layers project over the grooves adjoining the regions so that a target plate is obtained for a camera tube the advantages of which have already been described above.

It is to be noted that it is not necessary for the masking layer and the first insulating oxide layer to have different compositions. In another favourable embodiment of the method according to the invention layers of substantially the same compositions are used as a masking layer and as a first insulating oxide layer. This embodiment of the method presents a number of advantages. For example, when using silicon as a material for the semiconductor plate, both the masking layer and the first insulating layer can be obtained in a simple manner by oxidation of the semiconductor plate.

Also in the case of semiconductor plates of other semiconductor materials which cannot readily be provided with oxide by oxidation of the semiconductor plate, both the masking layer and the first insulating layer can be obtained by oxidation of, for example, silane from the gaseous phase.

After the first insulating layer has been obtained, the masking layer consisting of oxide is removed, the first insulating layer remaining unimpaired. This is carried out, for example, by polishing or by polishing and careful etching which, however, is a very critical process. Another possibility is to provide the surface oof the semiconductor plate with an etchant-resistant layer, for example, by dipping, then removing the etchant-resistant layer from the surface of the masking layer by means of a soft cloth, etching away the masking layer and dissolving the etchant-resistant layer from the grooves.

The masking layer is preferably removed by providing the surface of the semiconductor plate with an etchant-resistant positive photolacquer layer, the layer of photolacquer is exposed for a period of time which is short as compared with conventional exposure times, is developed, and then the masking layer is etched away.

In this embodiment the first insulating layer is not removed. It has actually been found that the thickness of the layer of photolacquer on the first insulating layer in the grooves is large as compared with the thickness of the layer of photolacquer on the masking layer on the regions, particularly at the edges of the masking layer. By a short exposure, a thick positive layer of photolacquer, as that in the grooves, becomes only superficially soluble in an associated solvent, while a thin layer, for example, that on the masking layer, becomes fully soluble at least at the edges.

During the etching after the development, at least the edges of the masking layer are etched and the whole masking layer is then removed by underetching. It has been found that during the underetching the edges of the rectifying junctions are not reached.

In a further preferred embodiment of the method according to the invention an impurity of one conductivity type is diffused in the substrate prior to the oxidation via the walls of the grooves so as to obtain a first more highly doped surface zone of the same conductivity type as the substrate, the maximum concentration of said impurity in the first surface zone being smaller than that of the impurity of the opposite conductivity type in those parts of the regions which adjoin the rectifying junctions. As a result of this a target plate with drift field for a camera tube is obtained, as already described above, in which during operation the removal of the minority charge carriers to the nearest regions is improved.

During the diffusion of the surface zone it is ensured that a rectifying junction possibly already provided is maintained and is at most slightly deformed, for example, at the edges.

It is also ensured that during the oxidation succeeding the diffusion the surface zone is only partly oxidized.

The masking layer is preferably removed from the regions after the other side of the substrate situated opposite to the side to be scanned has been subjected to a treatment for reducing surface recombination effects. Such a treatment usually consists of an oxidation and/or a diffusion treatment. By the measure of the last-mentioned preferred embodiment it is prevented that oxidation of and/or undesired diffusion of impurities in the regions occurs.

Simultaneously with the diffusion of the impurity to obtain the first surface zone, the same impurity is preferably diffused, via the other side, in the substrate to obtain a second surface zone to reduce surface recombination effects on this side. By this measure the above-described structure is obtained in a simple manner in which the concentration variation of the impurity determining the conductivity type in and the thickness of the first surface zone, at least in parts which do not adjoin the rectifying junctions, are substantially equal to the concentration variation of said impurity in and the thickness of, respectively the second surface zone.

According to still a further preferred embodiment of the method according to the invention an impurity of one conductivity type is diffused via the surface of parts of the regions to be obtained two sub-regions per region which together with the substrate form a transistor structure and, simultaneously with this diffusion, the same impurity is diffused in the substrate via the other side to obtain a second surface zone to reduce surface recombination effects on said side, so that a target plate according to the invention with a transistor structure is obtained in a simple manner having a substantially sufficient protection against surface recombination effects.

An oxidation treatment of the other side to obtain a second oxide layer to reduce surface recombination effects is preferably carried out simultaneously with the oxidation to obtain the first oxide layer. By this measure a target plate according to the invention is obtained in a simple manner having, for example, a transistor or a diode structure, which target plate has a substantially sufficient protection against surface recombination effects.

Figure 2:
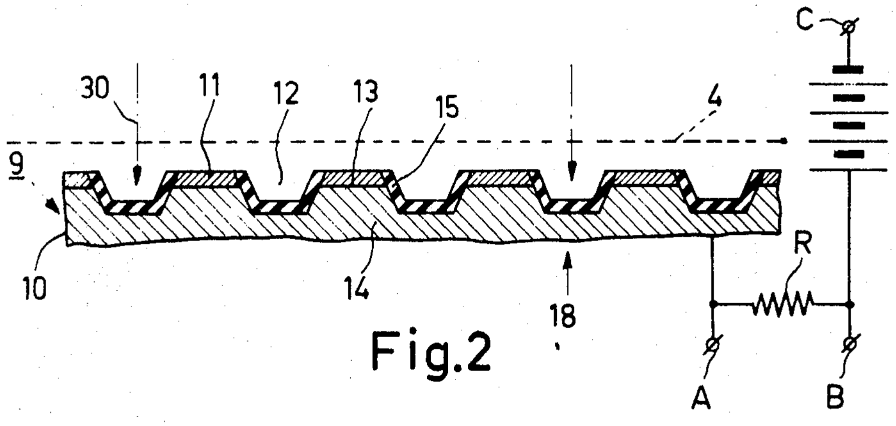
Figure 3:
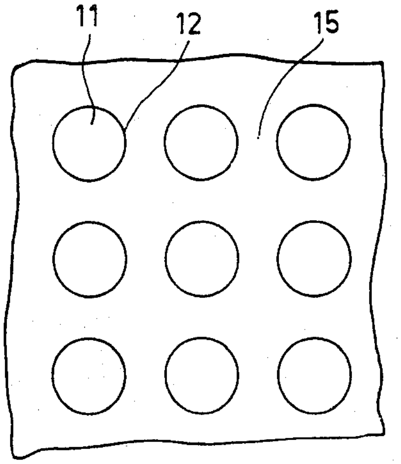
Figure 8:
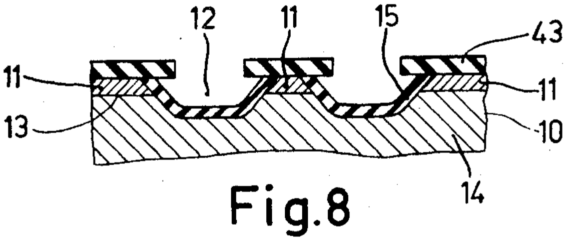
Figure 9:
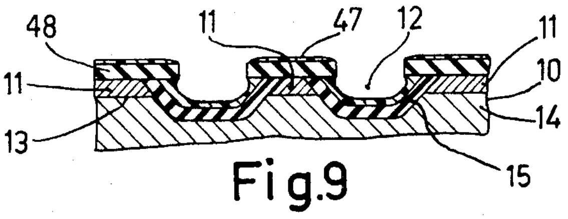
Figure 10:
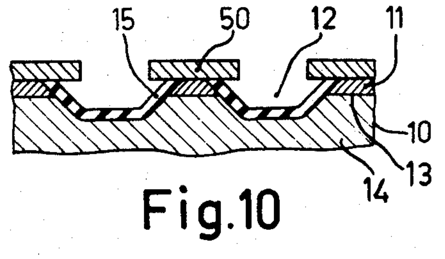
Figure 11:
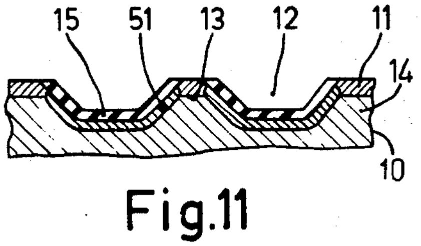
Figure 12:
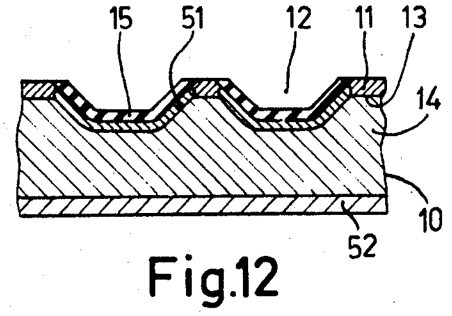
Figure 13:
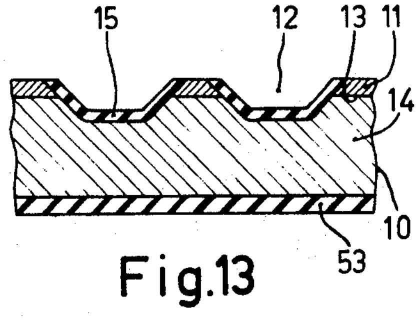

A few embodiments of the invention will now be described in greater detail, by way of example, with reference to the accompanying drawings, in which:

FIG. 1 is a diagrammatic cross-sectional view of an embodiment of a camera tube according to the invention in which FIG. 2 diagrammatically shows a cross-sectional view on an enlarged scale of a part of an embodiment of a target plate according to the invention, FIG. 3 is a diagrammatic plan view of a part of the target plate shown in FIG. 2, FIGS. 4 to 8 are diagrammatic cross-sectional views of the target plate shown in FIG. 2 in a number of stages of manufacture, FIG. 9 is a diagrammatic cross-sectional view of the target plate shown in FIG. 2 in a stage of a varied manufacture, FIG. 10 is a diagrammatic cross-sectional view of a target plate according to the invention, having a slightly varied structure, FIG. 11 is a diagrammatic cross-sectional view of a part of a third embodiment of a target plate according to the invention, FIG. 12 is a diagrammatic cross-sectional view of a part of a fourth embodiment of a target plate according to the invention, FIG. 13 is a diagrammatic cross-sectional view of a part of a fifth embodiment of a target plate according to the invention.

Figure 14:
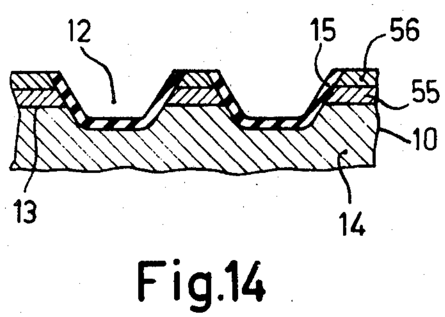
Figure 15:
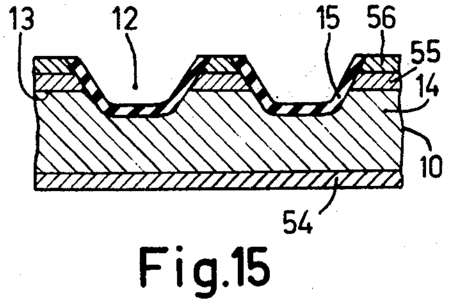

FIG. 14 is a diagrammatic cross-sectional view of a part of a sixth embodiment of a target plate according to the invention, FIG. 15 is a diagrammatic cross-sectional view of a part of a seventh embodiment of a target plate according to the invention.

The camera tube 1, for example, a television camera tube, shown in FIG. 1 has an electron source or cathode 2 and a radiation-sensitive target plate 9 (see also FIGS. 2 and 3) to be scanned by an electron beam originating from said source 2. The target plate 9 is formed by a semiconductor plate 10, which on the side to be scanned by the electron beam comprises a mosaic of regions 11 which are separated from one another by grooves 12 and which each form a rectifying junction 13 with the part 14 of one conductivity type of the semiconductor plate, termed the substrate 14, adjoining said regions 11.

According to the invention, the surface of the substrate 14 in the grooves 12 and the edges of the rectifying junctions 13 are provided with a first thin insulating layer 15.

The camera tube comprises in a conventional manner electrodes 5 for accelerating electrons and for focusing the electron beam. Furthermore, conventional means are present to deflect the electron beam so that the target plate 9 can be scanned. These means consist, for example, of a system of coils 7. The electrode 6 serves to screen the tube wall from the electron beam. A picture to be picked up is projected on the target plate 9 by means of the lens 8, the wall 3 of the tube being permeable to radiation. Furthermore, a collector grid 4 is present in normal manner. By means of this grid which may alternatively be, for example, an annular electrode, secondary electrons originating, for example, from the target plate 9 can be removed.

During operation the substrate 14 which consists of n-type silicon is biassed positively relative to the cathode 2. In FIG. 2 the cathode 2 is to be connected to the point C. When the electron beam 30 passes a region 11, said region is charged to substantially the cathode potential, the rectifying junction 13 being biassed in the reverse direction. The region 11 is then discharged fully or partly dependent upon the intensity of the radiation 18 which impinges upon the target plate in the proximity of the relative region 11. When the electron beam again passes the region 11, charge is again supplied until the region 11 has assumed substantially the cathode potential. This charging results in a current across the resistor R. This current is a measure of the intensity of the radiation 18 which has discharged the region 11 fully or partly in one scanning period. Out signals are derived from the terminals A and B via the resistor R.

In the present example the regions 11 consist of p-type silicon and the rectifying junctions 13 are p-n junctions.

The substrate 14 consists of n-type silicon having a resistivity of from 7 to 10 ohm cm and, depending upon the wavelength of the radiation to be detected, has a thickness of, for example, from 10 to 25 μ for use with normal light or approximately 200 μ for use with infrared detection. The regions 11 have a diameter of approximately 14 μ and a mutual distance of approximately 11 μ. The grooves 12 have a depth of approximately 5 μ, while the first thin insulating layer 15 consists of silicocn oxide, and is approximately 0.7 μ thick.

The target plate 9 can be manufactured as follows: starting material is an n-type silicon plate 10 (see FIG. 4) the large faces of which {111} -faces of a silicon crystal. The resistivity of the plate is from 7 to 10 ohm.cm, the diameter 2.5 cm and the thickness 300 μ.

The plate is cleaned and etched in a conventional manner after which the thickness is 200 μ. Boron oxide is then provided in any conventional manner on a surface of the plate and boron is diffused in the plate so that a zone 42 of the p-conductivity type is formed. The sheet resistance of the zone 42 is 160 Ω/□ and the diffusion depth 3.6 μ. The oxides formed during the diffusion are then removed by means of HF-solution.

A masking layer 43 of silicon nitride having a thickness of 0.2 μ is then formed on the surface in a conventional manner on which a silicon oxide layer 44 is provided with a thickness of also 0.2 μ. The layer 44 is provided with a layer 45 consisting of a negative photolacquer which is commercially available under the tradename KTFR. A negative photolacquer is a lacquer which becomes less soluble in an associated solvent due to exposure.

Figure 5:
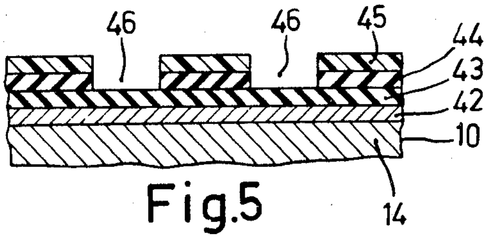
Figure 6:
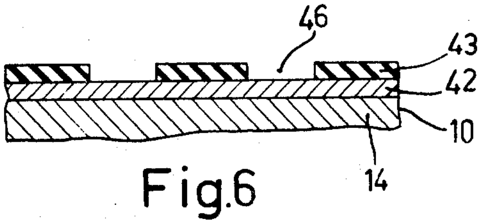
Figure 7:
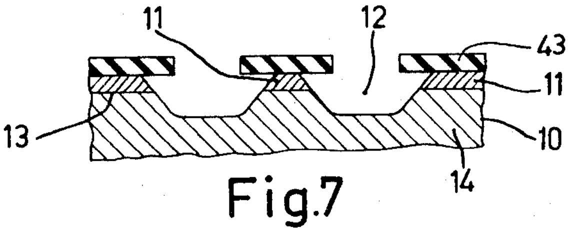

The photolacquer 45 is exposed by means of a mask not shown in the drawing and the unexposed parts are dissolved in an associated solvent so that apertures 46 are formed (see FIG. 5). The remaining parts of the layer of phgotolacquer have a diameter of 20 μ and a neutral distance of 5 μ.

The layer of photolacquer 45 serves as a mask during etching the silicon oxide layer 44, after which the layer of photolacquer is removed.

The silicon oxide layer 44 in turn serves as an ethcing mask for the silicon nitride layer 43 which is etched in a normal manner, after which the silicon oixide layer is removed. The result is a silicon plate 10 having a diffused zone 42 and a masking layer 43 of silicon nitride which consists of parts which have a diameter of approximately 20 μ and which are approximately 5 μ apart (see FIG. 6).

The surface of the plate is now subjected at the area of the apertures in the masking layer of silicon nitride to a treatment for removing material. The silicon nitride layer 43 first serves as a mask during etching the plate. For that purpose, the plate is treated at 2°C for 1 minute with a solution consisting of 17 % by volume of concentrated $HNO_3$, 38 % by volume of fuming $HNO_3$, 11 % by volume of 40 % HF and 44 % by volume of glacial acetic acid. As a result of this treatment, grooves 12 (see FIG. 7), depth approximately 5 μ, are etched in the plate and an underetching of approximately 3 μ occurs below the silicon nitride layer at the surface of layer 42. Regions 11 have now formed which have a diameter of approximately 14 μ and are approximately 11 μ apart.

The silicon nitride layer 42 then serves as a mask during an oxidation as a result of which the surface of the plate in the grooves is provided with an oxide layer 15 (see FIG. 8). The oxidation takes place by exposing the plate to an atmosphere at 1,050°C for 2 hours, which atmosphere consists of $N_2$ which is saturated with water vapor at 95°C. The silicon oxide layer formed is 0.8 μ thick. Etching is then carried out for 2 minutes in $NH_4F/HF$ buffer to remove the part of the nitride which has been converted into silicon oxide during the oxidation. The thicknes of the silicon oxide layer 15 then is 0.7 μ. The silicon nitride layer 43 is finally removed in a normal manner (see FIG. 2).

The silicon plate is finally etched in a conventional manner to a thickness of from 10 to 25 μ. This thickness is normal when the camera tube is used for normal light. When used for the detection of infrared radiation, the last-mentioned etching treatment need not be carried out.

The configuration of FIG. 2 is also obtained in the case which layers of the same composition are used as a masking layer and as a first insulating oxide layer. No silicon nitride layer 43 is provided on the zone 42 of the p-conductivity type, but a silicon oxide layer is directly provided on the layer 42. In this case the oxide layer can be obtained by oxidation of the semiconductor plate. The oxide layer now takes over the function of the nitride layer as a masking layer during etching of the plate. The oxide layer is denoted in FIG. 9 by reference numeral 48.

After the grooves 12 have been provided with the first oxide layer 15 by oxidation, the semiconductor plate is dipped in a positive photolacquer. A positive photolacquer is a lacquer which becomes more soluble in an associated solvent by exposure. Excessive photolacquer is removed in a conventional manner from the semiconductor plate by centrifuging the plate at 3,000 rpm. The layer 47 of photolacquer is found to be considerably thinner on the masking layer 48, particularly at the edges of said layer, than on the walls of the grooves 12, particularly below the parts of the masking layer 48 which project over the grooves 12.

The layer 47 of photolacquer is then exposed for half the exposure time conventional for a layer of photolacquer and developed in an associated solvent.

It is then found that the layer 47 of photolacquer on the masking layer 48 is at least partly removed and is still a dense layer on the walls of the grooves. During the subsequent etching step, the masking layer 48 and then the remains of the layer 47 of photolacquer are removed in a conventional manner so that the configuration shown in FIG. 2 is obtained.

FIG. 10 relates to an embodiment which is slightly varied relative to the embodiment shown in FIGS. 2 and 3 and in which a metal layer 50 is provided on each region 11, which layer projects over the grooves 12 adjoining the region.

During the manufacture of the target plate shown in FIG. 10, a rhodium layer of 0.3 $\mu$ is provided electrolytically after the diffusion of boron.

The oxide layer 15 in the grooves 12 is obtained by placing the semiconductor plate 10, after the etching of the rhodium layer, in an oxygen-containing atmosphere at a distance of approximately 0.2 mm from the lead oxide-containing substance at 650°C for 90 minutes. The metal layer 50 need not be removed. A camera tube with a target plate shown in FIG. 10 has an advantage which has already been described above.

FIG. 11 shows a third embodiment in which a first surface zone 51 of the substrate 14 which is of the same conductivity type as but is more strongly doped than the part of the substrate adjoining said zone, adjoins the walls of the grooves 12. The surface zone 51 extends up to the rectifying junction 13. During the manufacture of the target plate shown in FIG. 10 an impurity of the same conductivity type as the substrate is diffused in the grooves in a conventional manner after etching the grooves and prior to the oxidation of the surface of the semiconductor plate, it being ensured that the maximum concentration of said impurity in the surface zone 51 is smaller than that of an impurity of the opposite conductivity type in those parts of the regions 11 adjoining the rectifying junctions.

In such a diffusion, an oxide layer is often formed on the surface of the grooves in the substrate, which layer contains the impurity of the same conductivity type as the substrate. Such a layer can often also serve as an insulating oxide layer, so that oxidation need not be carried out again.

It will be obvious that the regions 11 can be obtained, besides in the above-described manner, namely via a boron diffusion at the beginning, also after providing the oxide layer 15 and removing the masking layer.

The masking layer is preferably removed after the other side of the substrate situated opposite to the side to be scanned has been subjected to a treatment for reducing surface recombination effects. When said treatment is a diffusion, it is carried out so that a target plate is obtained having a second surface zone 52 of the substrate 14 (see FIG. 12) which has the same conductivity type as, but is more strongly doped than the part of the substrate adjoining said zone and which adjoins the other side situated opposite to the side to be scanned.

For simplicity, the diffusion of the impurity to obtain the first surface zone 51, is preferably carried out simultaneously with the diffusion of the same impurity via the other side in the substrate to obtain the second surface zone 52.

During the said diffusion treatment, an oxide layer is often formed on the other side of the substrate which contains the impurity of the same conductivity type as the substrate. Such a layer can often reduce surface recombination effects.

A treatment to reduce surface recombination effects on the other side of the substrate can also consist exclusively of an oxidation treatment, a target plate being obtained (see FIG. 13) in which the substrate is provided with a second oxide layer 53 on the said side. The substrate is preferably provided simultaneously with the first and the second oxide layer (the layers 15 and 53, respectively).

FIG. 14 shows a sixth embodiment in which the regions consist of two sub-regions 55 and 56 which together with the substrate 14 constitute a transistor structure.

Figure 4:

In manufacturing the transistor structure an impurity of one conductivity type is diffused after an impurity of the opposite conductivity type, for example, boron, has been diffused to obtain the layer 42 (see FIG. 4).

An impurity of one conductivity type is preferably diffused via the surfaces of parts of the regions to be obtained so as to obtain two sub-regions 55 and 56 per region (see FIG. 15) which together with the substrate 14 form a transistor structure, and, simultaneously with the said diffusion, the same impurity is diffused via the other side in the substrate to obtain a second surface zone 54 to reduce surface recombination effects on said side.

It will be obvious that the invention is not restricted to the embodiments described and that many variations are possible to those skilled in the art without departing from the scope of the invention.

Instead of n-type conductivity the substrate may have p-type conductivity, and the regions may be n-type conductive instead of p-type conductive, an electron beam being used having high-velocity electrons so that the secondary emission ratio is larger than 1, and the regions are charged with positive charge instead of with negative charge. In this case the collector grid 4 in FIG. 1 must have a higher potential than the substrate of the target plate 9.

Instead of visible light or infrared radiation, the radiation 18 may consist of X-rays or rays of charged particles.

Furthermore, the semiconductor plate of the target plate may consist of germanium or an $A_{III}B_{V}$ compound instead of silicon. The semiconductor plate of the target plate need not be a self-supporting semiconductor plate, but may consist of a semiconductor layer which is provided on an insulating support, for example, a transparent support.

The first insulating oxide layer 15 may consist, for examples, of a silicon oxide layer on the surface of the semiconductor plate in the grooves, with a phosphate glass layer provided thereon.

On the first thin insulating layer may be provided a layer having a resistance per square of from $10^{13}$ to $10^{16}$ $\Omega/\square$ which may be used for removing charge which is provided in the oxide by the electron beam. Such a layer may consist, for example, of PbO, $Sb_2S_3$ and GaAs.

What is claimed is:

1. A method of manufacturing a radiation-sensitive target plate for use in a camera tube comprising a semiconductor plate having on one side thereof a mosaic of projecting regions separated from one another by grooves and each forming with the plate a rectifying junction comprising the steps of providing an apertured masking layer on one surface of a plate of semiconductor material having adjacent said surface a zone of one conductivity type, removing material from the surface of the plate at the area of the apertures in said apertured masking layer to obtain grooves of a given depth separating the regions, oxidizing the semiconductor plate only in the grooves to provide a first insulating oxide layer thereon, then removing the mask and leaving the underlying surface of said plate exposed so as to provide the mosaic of projecting regions.

2. A method as claimed in claim 1, wherein the material is removed by etching and an etchant and oxidation-resistant masking layer containing silicon nitride is used.

3. A method as claimed in claim 1, wherein layers of substantially the same compositions are used as a masking layer and as a first insulating oxide layer.

4. A method as claimed in claim 3, wherein the masking layer is removed by providing the surface of the semiconductor plate with an etchant-resistant positive photolacquer layer, the photolacquer layer is exposed for a period of time which is short as compared with conventional exposure times and is then developed, after which the masking layer is etched away.

5. A method as claimed in claim 1, wherein the material is removed by etching and an etchant and oxidation-resistant metal layer is used as a masking layer.

6. A method as claimed in claim 1 wherein prior to the oxidation an impurity of one conductivity type is diffused in the substrate via the walls of the grooves so as to obtain a first more highly doped surface zone of the same conductivity type as the substrate, the maximum concentration of said impurity in the first surface zone being smaller than that of the impurity of the opposite conductivity type in those parts of the regions which adjoin the rectifying junctions.

7. A method as claimed in claim 1 wherein the masking layer is removed from the regions after the side of the substrate opposite the side to be scanned has been subjected to a treatment for reducing surface recombination effects.

8. A method as claimed in claim 6 wherein simultaneously with the diffusion of the impurity to obtain the first surface zone, the same impurity is diffused in the substrate, via the other side, to obtain a second surface zone to reduce surface recombination effects on the said other side.

9. A method as claimed in claim 1, wherein via the surfaces of parts of the regions to be obtained an impurity of one conductivity type is diffused to obtain two sub-regions per region which together with the substrate form a transistor structure and, simultaneously with said diffusion, the same impurity is diffused in the substrate via the other side to obtain a second surface zone to reduce surface recombination effects on the other side.

10. A method as claimed in claim 1 wherein the other side of the semi-conductor plate is oxidized to obtain a second oxide layer to reduce surface recombination effects simultaneously with the oxidation to obtain the first oxide layer.

* * * * *